United States Patent [19]

de Corlieu et al.

[11] Patent Number: 4,891,810
[45] Date of Patent: Jan. 2, 1990

[54] RECONFIGURABLE COMPUTING DEVICE

[75] Inventors: Patrick de Corlieu, Sevres; Michel Prevost, le Plessis Robinson; Arnaud du Chéné, Paris, all of France

[73] Assignee: Thomson-CSF, Paris, France

[21] Appl. No.: 114,109

[22] Filed: Oct. 27, 1987

[30] Foreign Application Priority Data

Oct. 31, 1986 [FR] France ................ 86 15241

[51] Int. Cl.$^4$ .............................. G06F 11/16
[52] U.S. Cl. ....................... 371/9.1; 371/11.3
[58] Field of Search ............. 371/9, 11, 8, 68; 364/187, 200 MS

[56] References Cited

U.S. PATENT DOCUMENTS

| | | | |
|---|---|---|---|
| 4,231,015 | 10/1980 | Union | 371/11 X |
| 4,347,563 | 8/1982 | Parades | 371/9 X |
| 4,412,281 | 10/1983 | Works | 371/9 X |
| 4,562,575 | 12/1985 | Townsend | 371/9 |
| 4,627,055 | 12/1986 | Mori | 371/11 X |
| 4,635,184 | 1/1987 | Schuss | 371/9 X |
| 4,654,846 | 3/1987 | Goodwin | 371/9 X |
| 4,654,857 | 3/1987 | Samson | 371/9 X |
| 4,709,365 | 11/1987 | Beale | 371/11 |

Primary Examiner—John R. Lastova
Assistant Examiner—Robert W. Beausoliel
Attorney, Agent, or Firm—Roland Plottel

[57] ABSTRACT

The invention pertains mainly to a reconfigurable computing device. The main object of the invention is a computer comprising redundant elements. The computer according to the present invention can function when there is a failure of one of the elements that constitute it. In this case, the redundant element takes the place of the malfunctioning element. Should the computer according to the present invention be in a critical stage, i.e. a situation where any interruption in computation would have serious consequences, the reconfiguring of the system is postponed to a later instant corresponding to the end of the critical stage. The invention applies mainly to the performing of digital computations.

12 Claims, 5 Drawing Sheets

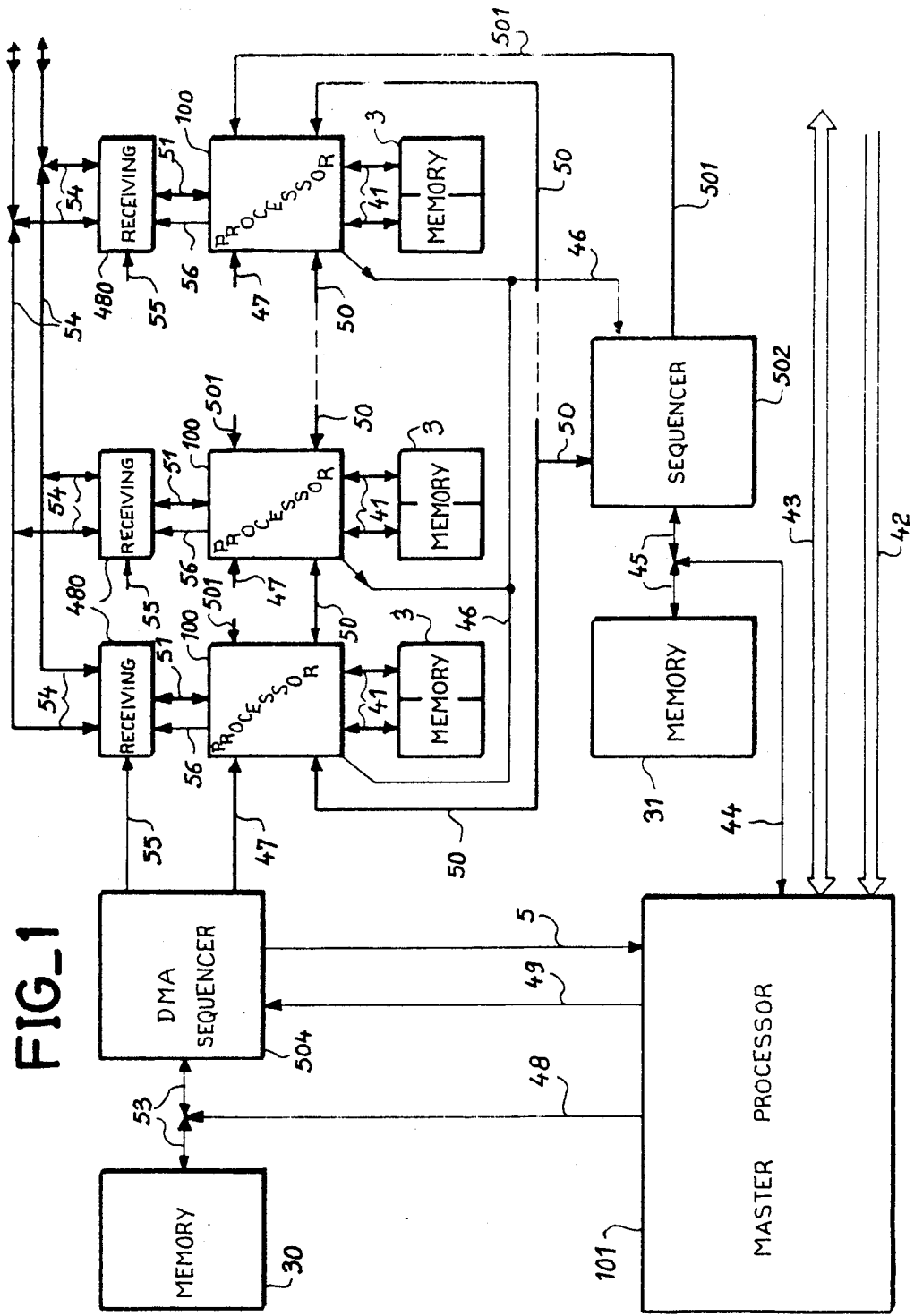
FIG_1

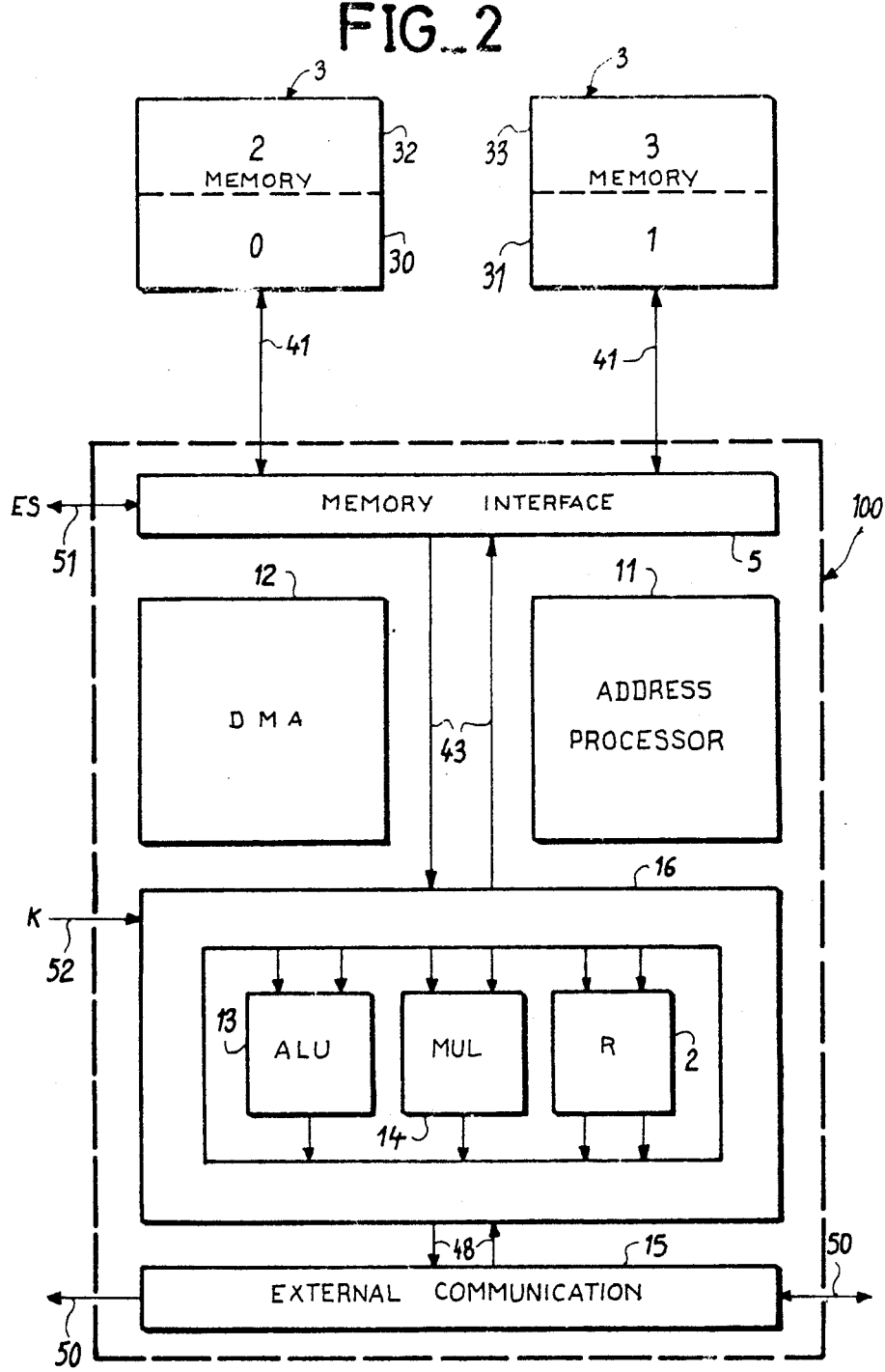
FIG_2

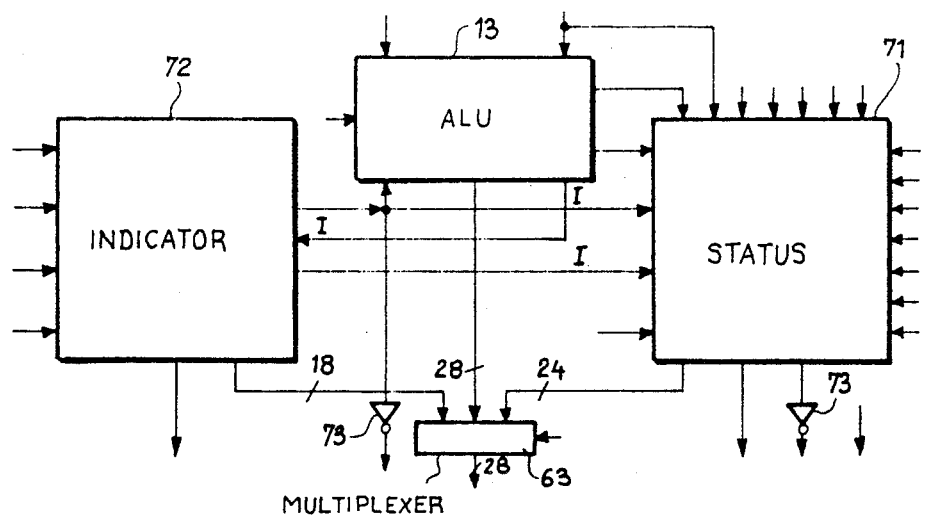
FIG_3
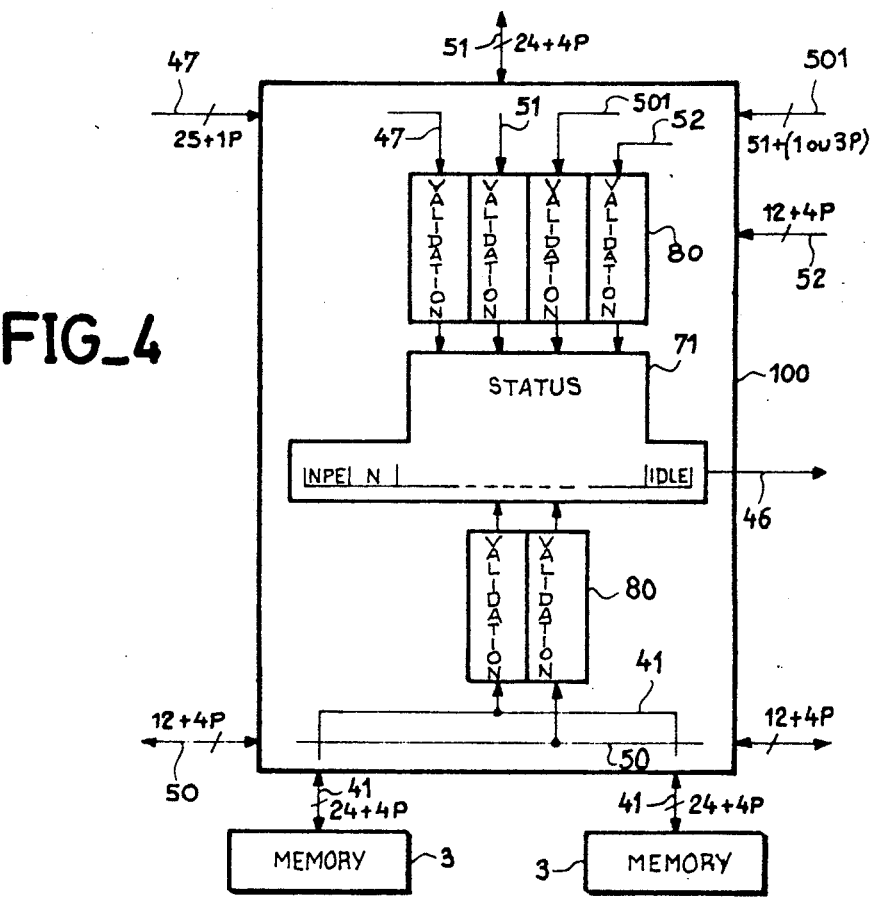
FIG_4

FIG_5
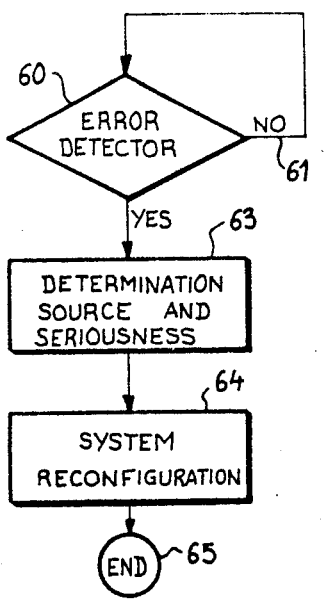
FIG_6
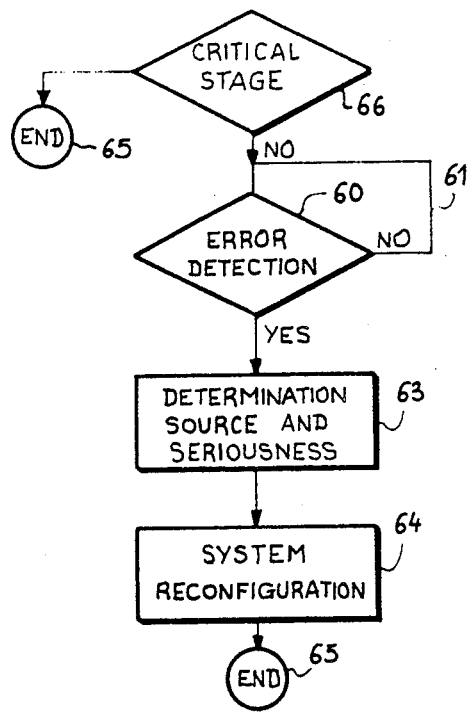
FIG_7
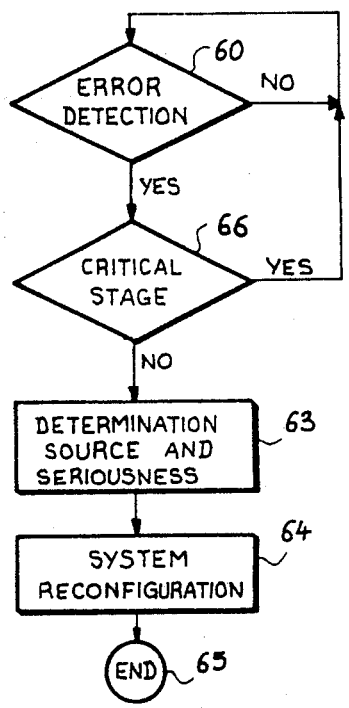
FIG_8
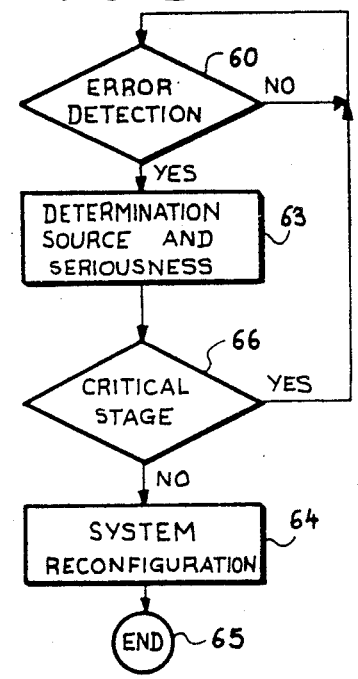

FIG_9
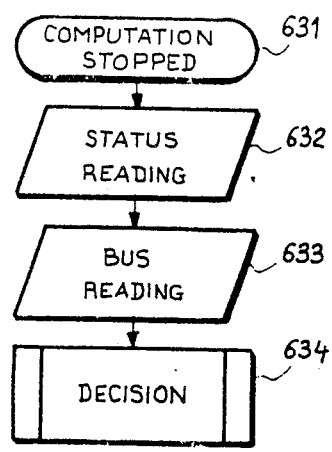
- 631 COMPUTATION STOPPED
- 632 STATUS READING
- 633 BUS READING
- 634 DECISION
FIG_10
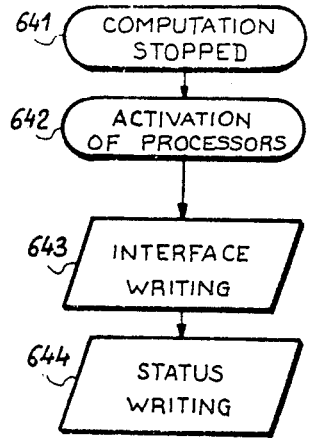
- 641 COMPUTATION STOPPED
- 642 ACTIVATION OF PROCESSORS
- 643 INTERFACE WRITING
- 644 STATUS WRITING
FIG_11
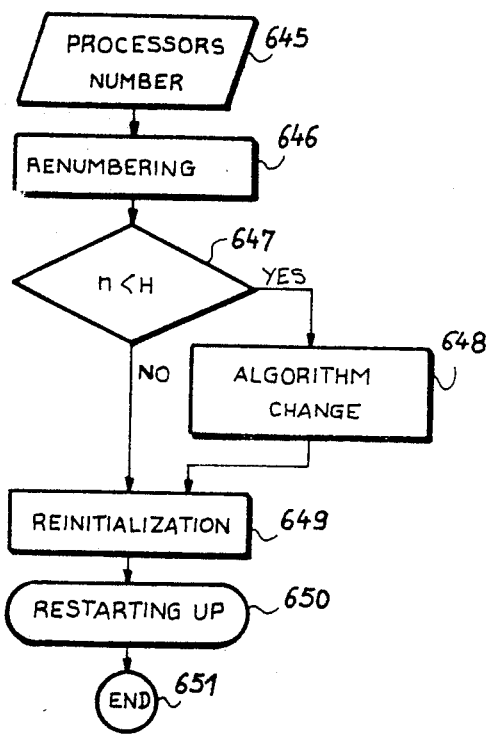
- 645 PROCESSORS NUMBER
- 646 RENUMBERING
- 647 $n < H$
- 648 ALGORITHM CHANGE
- 649 REINITIALIZATION
- 650 RESTARTING UP
- 651 END
FIG_12
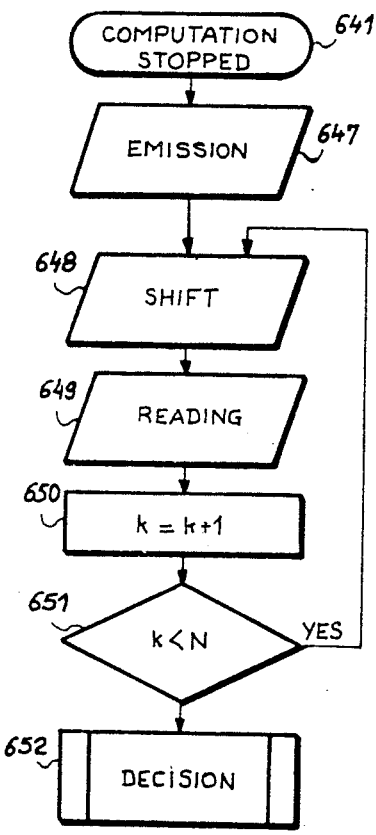
- 641 COMPUTATION STOPPED
- 647 EMISSION
- 648 SHIFT
- 649 READING
- 650 $k = k+1$
- 651 $k < N$
- 652 DECISION

RECONFIGURABLE COMPUTING DEVICE

BACKGROUND OF THE INVENTION

1. Field of the Invention

The main object of the invention is a reconfigurable computing device.

2. Description of the Prior Art

Computers are becoming increasingly complex today. The present trend in the making of computers is towards machines comprising several processors that simultaneously process the same instruction (single instruction multiple data stream or SIMD machines). A modern computer is capable of being partially out of order, i.e. a portion of the results given by the computer will be erroneous while another part of the computations is not affected by the failure. The device of the present invention is a computer capable of functioning even when a portion of its elements undergoes are malfunctioning. For example, if the failure occurs place in a processor, it will not be possible to use the said processor in the rest of the computations.

In the first case, where there is a number of processors greater than the number needed to perform the computations, the malfunctioning processor is deactivated. A processor which is not in use may resume the calculation which was to have been performed by the malfunctioning processor.

In the second case, the processors in working order share out the work of the malfunctioning processor which is put out of the circuit.

Thus, in both cases, the computer is reconfigured. Now, computers are increasingly being used for the real-time supervision of machines. A reconfiguration at a critical moment, given that some of the results delivered by the computer remain valid, may have far worse consequences than the continuation of computations by a partly defective computer. For the risk entailed by a reconfiguration is that the computer may lose the results of the computations in progress as well as the intermediate results.

SUMMARY OF THE INVENTION

The computer of the present invention detects failures, if any, in these various components, determines the most opportune moment to perform a reconfiguration of the system and performs the said reconfiguration.

The main object of the invention is a computer comprising several computing processors, comprising redundant devices capable of replacing a malfunctioning device in the event of failure.

BRIEF DESCRIPTION OF THE DRAWINGS

The invention will be better understood from the following description and the appended figures given as non-exhaustive examples. Of these figures:

FIG. 1 is a diagram of a computer according to the invention;

FIG. 2 is the diagram of a processor of the computer of FIG. 1;

FIG. 3 is a diagram of an arithmetic and logic unit and the indicator circuits of a processor of the computer of FIG. 1;

FIG. 4 is a diagram of the processor of the computer of FIG. 1;

FIG. 5 is a flow chart illustrating a method used in the device according to the invention;

FIG. 6 is a flow chart illustrating a method used in the device according to the invention;

FIG. 7 is a flow chart illustrating a method used in the device according to the invention;

FIG. 8 is a flow chart illustrating a method used in the device according to the invention;

FIG. 9 is a flow chart illustrating a method used in the device according to the invention;

FIG. 10 is a flow chart illustrating a method used in the device according to the invention;

FIG. 11 is a flow chart illustrating a method used in the device according to the invention;

FIG. 12 is a flow chart illustrating a method used in the device according to the invention;

FIGS. 1 to 12 use the same references to designate the same elements.

DESCRIPTION OF THE PREFERRED EMBODIMENTS

FIG. 1 shows an embodiment of a parallel (single instruction multiple data or SIMD) computer according to the invention. The computer has N processors 100. The processors 100 are, for example, high-powered digital processors required for the processing of signals. An example of the processor 100 is shown in FIG. 2.

The processors 100 are connected to a data memory 3.

Advantageously, each processor 100 is connected by a bus 41 to a reserved memory bank 3.

Advantageously, each processor 100 is connected by two buses 41 to a memory 3 divided into two memory banks.

Advantageously, the processors 100 are capable of communicating with one another through a bus 50.

Advantageously, the bus 50 is a bus organized in rings.

Advantageously, the computers according to the invention comprise a sequencer 502 giving, through a bus 501, the instructions needed for the functioning of the processors 100. The sequencer 502 is connected to a program memory 31 by a bus 45.

Advantageously, the data capable of being processed by the processor 100 are loaded in the memory bank 3 during the computation by the processor 100. The loading of the memories 3, as regards the data flowing through the bus 51, is supervised by a direct memory access sequencer 504. The direct memory access sequencer is connected to a program memory 30 by means of a bus 53.

In a first embodiment of the device according to the invention, the memory banks 3 have a data bus reserved for the direct memory access.

Advantageously, the exchanges with the memory banks 3 are done through processors 100 by the bus 41. This solution has the advantage of simplifying the connections of the computer according to the invention.

Advantageously, the direct memory access sequencer is connected by a bus 47 to the processor 100. The bus 47 enables the direct memory access sequencer 504 to select the direct access mode used and the addresses of the memories 3 as regards the data transmitted by the bus 51.

Advantageously, the processors 100 receive the data to be stored in the memory 3 through several wide-band buses 54. The use of several buses increases the transfer rates of the data transmitted.

Advantageously, the computers according to the present invention comprise receiving circuits 480 which are used to transmit the data arriving at several buses 54 to a single input/output bus 51 at the processor 100. Since the bus 51 is small in length, its pass-band is, for example, equal to the sum of the total pass-band of the buses 54. In an alternative embodiment, its pass-band is smaller.

Advantageously, the receiving circuits 480 can also be used for the electrical adaptation of the buses 54, thus increasing the transfer rate of the said buses.

Advantageously, the receiving circuits 480 make it possible, through the use of a three-state electronic device for example, to insulate the processor 100 from the buses 54. This electrical insulation makes it possible, when all except one of the receiving circuits 480 are in high impedance, for the processor 100, which has its receiver circuit in low impedance, to transmit data to the bus 54. The receiver circuits 480 receives the operating commands partly from the direct memory access sequencer 504 through a bus 55. The other part of the commands comes directly from the associated processor 100 through the path 56.

Advantageously, the computer according to the invention comprises a master processor 101 which supervises the proper functioning of the computer. The master processor 101 is, for example, a general-purpose processor.

In one embodiment of the device according to the present invention, the master processor 101 belongs to the 68000 range of general-purpose microprocessors marketed by the MOTOROLA Company. For example, the master processor 101 is a microprocessor 68020 marketed by the MOTOROLA Company. It may be noted that the computing power of the master processor 101 is smaller by several magnitudes than the computing power of the processor 100. However, this computing power is enough to supervise the proper functioning of the computer according to the invention. The master processor 101 is connected by a bus 42 to the control device, for example, to a front-end computer, from which it receives the commands for computations to be performed. The master processor 101 is also connected by a bus 43 to upstream and downstream processing devices. The term "upstream processing devices" refers to devices for the analog and/or digital devices for the preprocessing of signals such as, for example, samplers, fast Fourier transform computers, the downstream devices being capable of using the computations made by the computer according to the invention. The downstream devices are, for example, general-purpose computers. Furthermore, the master processor 101 is connected by a data bus 48 and the bus 53 to the memory 30.

The master processor 101 is connected by a bus 44 and the bus 45 to the memory 31. The master processor can thus load the programs, needed for the functioning of the computer, from the memories 30 and 31 respectively connected to the direct memory access sequencer 504 and to the sequencer 502. These programs are loaded from mass storage devices such as magnetic disks or magnetic tapes, not shown in FIG. 1.

Furthermore, the master processor 101 is connected by a control bus 49 to the direct memory access sequencer 504.

Advantageously, the direct memory access sequencer 504 will distribute the flow of data to be processed, coming from the upstream processing devices through the bus 54, among the various processors 100 in operation. Simultaneously, the sequenceur 502 will number the processors 100, assigning a task to them. To the extent that all the processors 100 receive the same command through the bus 501, they simultaneously perform the same processing operation. However, each processor 100 has a control bus 56 which connects it to the receiving circuit 480. Thus each processor 100 can act on its receiving circuit 480 in a manner determined by the result of the computations performed by it.

The computer according to the present invention, as described in FIG. 1, is a very powerful and very complex computer. Thus it is possible that computing errors are made by faults in the equipment. To prevent errors from spreading, the computer according to the present invention comprises, especially in certain buses, parity coders and correctors. For example, error detection and correction facilities are available in the buses 54, 51, 47, 50, 41 and 501.

Advantageously, when an error is detected in a bus, it is stored in a status register. For example, for as long as no error has been detected, the status register has only zeros. When an error is detected, the value corresponding to the bus monitored in a status register goes to 1.

Advantageously, a summary of the content of the status registers of the processors is permanently sent to a bus 46 towards the sequencer 502.

Advantageously, to reduce the pass-band needed, all the processors 100 emit simultaneously to the same bus 46. The reduction of the pass-band is done by connecting the test result wires to an OR logic gate. Furthermore, the bus 46 is a bus that conveys a single bit. This arrangement reduces the equipment needed to the minimum, but lets the sequencer 502 know only that a failure has taken place but not its origin and seriousness. It is only if a failure takes place and if the sequencer 502 deems it necessary that it can read, for example, through the bus 50, the content of the status register of all or a part of the processors 100.

Advantageously, the computer according to the present invention further comprises H processors needed to correctly perform the computations of the redundant processors 100. These redundant processors 100 are capable of replacing a processor 100 that is performing a computation if the said processor proves to be malfunctioning. For example, the computer according to the present invention has eighteen processors 100 (N=18), sixteen processors being used simultaneously to perform the computations. When the computations are made by the computer according to the resent invention, the sequencer 502 assigns a number to each of the H processors 100 that have to be used for the computations.

Advantageously, the processors are numbered in an order which depends on their physical positions within the computer.

Furthermore, the H processors which must perform computations receive a control signal through the bus 50, for example, on one bit, to activate the processor. This bit is then stored in the processor 100.

The N-H redundant processors 100 are not used for the computations.

In a first alternative embodiment of the computer according to the present invention, these redundant processors 100 are off or they are in a low-power configuration.

In a second alternative embodiment of the computer according to the present invention, the redundant processors 100 perform any computation to keep them in activity. The results of these computations are neither transmitted nor used.

In a third alternative embodiment of the computer according to the present invention, the redundant processors 100 perform the same computations as the H processors 100 performing useful computations. The results of these calculations, performed by the redundant processors 100 are not taken into account.

The inactive processors receive a de-activation command, for example, on one bit. This makes it possible, especially for embodiments where one number is assigned to each processor, to assign one and the same number to an active processor and to an inactive processor.

In the embodiment of a computer according to the present invention shown in FIG. 1, only the processor 100 is physically redundant. This is warranted firstly, by the fact that, in one embodiment, the processors 100 have a computing power which is far greater than that of the other devices used and, consequently, greater complexity and greater probability of failure. It is warranted secondly, by the fact that since, in any case, the computer according to the present invention has several (H) processors 100, it is not necessary to double the equipment used.

For example, in the computer comprising sixteen processors capable of being active simultaneously, there are one (N=17) or two (N=18) redundant processors 100.

Similarly, in an alternative embodiment of a computer according to the present invention comprising thirty-two processors 100 capable of working simultaneously (H=32), there are three (N=35) of four (N=36) redundant processors 100.

It is clearly understood that doubling the other components of the computer according to the present invention, except for the master processor 101, is not beyond the scope of the present invention. As the master processor 101 supervises the detection of failures as well as the restarting up of the system, it must necessarily be single. This does not create any difficulty inasmuch as the processors used take the form of reliable integrated circuits available in the market.

Advantageously, the master processor 100 undergoes exhaustive tests as well as a burn-in prior to being used.

The alternative embodiment of the computer according to the present invention comprises, for example, a direct memory access sequencer 504, a memory 30 or a part of a memory 30, a sequencer 502, a memory 31 or a part of a redundant memory 31, the N-H processors 100, these devices being connected by the buses 46, then 45 and 44 to the master processor 101. The said master processor 101 can thus determine the origin of the failure and reconfigure the system if it considers it to be necessary.

Advantageously, the master processor uses the data received at the bus 42 to determine whether or not the system is in a critical stage, namely, whether the momentary interruption of the computations would be extremely harmful at that moment.

If the system is in a critical stage, the master processor 101 can, if possible, partially reconfigure the system to the extent possible. For example, if a processor 100 emits erroneous results, this processor is isolated from the buses 54 by its receiving circuit 480. The tasks normally performed by this processor 100 are not taken into account at all.

If, on the other hand, the bus organized in rings 50 is cut off, the master processor 101 makes the necessary data flow in the other direction on the ring-connected bus 50 until the said data reach their destination.

The N-H inactive processors 100 are not perceived by the bus 50.

FIG. 2 shows an embodiment of a processor 100 according to the invention. For the clarity of the figure, only the data buses have been shown. The embodiment of the processor 100 according to the invention, shown in FIG. 2, comprises an arithmetic and logic unit 13, a multiplier 14 and a register bank 2. A communications device 16 is used to furnish data needed for computations to the inputs of the arithmetic and logic unit 13, the multiplier 14 and the register bank 2. Similarly, the communications device 16 can be used to collect the results of the computations by the arithmetic and logic units 13 and the multiplier 14 as well as to read the data stored in the register 20 of the register bank 2. Furthermore, the communications device 16 is connected by a bi-directional bus (or two buses) 43 to the memory interface 5, by a bus 52 to a device (not shown), which is capable of giving constants needed for the computations, and to the external communications devices 15 by a bi-directional bus (or two buses) 48. The external communications device 15 is, for example, a communications interface by which several processors 100 according to the invention, can be connected in rings. For example, each processor 100 is connected to its neighbour on the right and on the left. The information can spread from one processor to the next one until it reaches the processor for which it is intended. A device of this type is described in the French patent No. 83 15649.

The processor 100 according to the present invention advantageously comprises a direct memory access circuit 12 and an address processor 11. A memory interface 5 provides access to a random-access memory (RAM) 3. The memory 3 advantageously consists of two memory banks connected by buses 41 to the interface 5. Each memory bank is advantageously divided into memory pages, the total number of memory pages being advantageously equal to the number of pipe-line stages of the processor 100. In the example shown in FIG. 3, since the processor 100 is equal to four pipe-line stages equivalent to four virtual processors, each memory bank 3 comprises two memory pages, 30 and 32 on the one hand and 31 and 33 on the other.

To make it possible to access a datum in memory 3, the address processor 11 transmits the address of the datum to be read through the address bus (not shown). The datum is transmitted through the bus 41 to the memory interface 5, and then from the memory interface 5, through the buses 43 to the communications device 16. The communications device 16 transmits the datum to the arithmetic and logic unit 13, the multiplier 14, one of the registers 20 of the register bank 2 and/or the external communications device 15.

The memory interface 5 is furthermore connected to an input/output bus 51.

The direct memory access device 12 can be used to read or write in the memory 3, through the bus 51 of the memory interface 5, without going through the communications device 16. The division of the random-access memory 3 into two memory banks provides for direct memory accessing in a memory bank while the other memory bank is exchanging information through the communications device 16.

Advantageously, the communications device 16 is connected to two inputs of the arithmetic and logic unit 13, two inputs of the multiplier 14, one input of the external communications device 15, two inputs of the bank 2 of registers 20, one input of the memory interface 5, one output of the memory interface 5, one output of the constant bus 52, one output of the arithmetic and logic unit 13, one output of the multiplier 14, two outputs of the bank 2 of registers, one output of the external communications device 15. The communications device 16, depending on the instructions that it receives, provides for the various interconnections desired.

In one embodiment, the communications device 16 comprises multiplexers. For example, the communications device has eight multiplexers, 7 towards 1, i.e. with the ability to select one out of seven possible outputs.

The communications device 16 thus enables the processor of the invention to perform several desired computations. The instructions concerning the interconnections to be made are received either from a program memory or from a sequencer (both not shown). The address processor 11 is connected to the bus 41 which connects the memory interface 5 with the memory 3. The address processor 11 is connected by an address bus 131 to the random-access memory 3.

In one alternative embodiment of the invention, the various elements of the computer are on-line testing devices. If an operating fault is detected, the content of the status register is modified.

FIG. 3 shows an alternative embodiment of the device according to the invention comprising indicator registers as well as status registers. These registers receive data on the status of the processor 100 according to the present invention, enabling or prohibiting certain operations. The indicator device 72 receives the indications I from the arithmetic and logic unit 13. It transmits them to the status register 71. Furthermore, the indicator register 72 and the status register 71 receive data from outside, needed for the proper functioning of the system. The indications contained in the status register and the indicator register can be read directly either by a 28-bit bus multiplexed by a multiplexer 63 with the arithmetic and logic unit 13. Advantageously, the indicator register 72 has a counter which can be controlled by the arithmetic and logic unit 13 and from outside the processor 100. The counter is, for example, an events counter.

Certain accesses from or to the indicator register 72, the status register 71 and the arithmetic and logic unit 13 are reversed by the reversing operators 73.

FIG. 4 shows the connection of the status register with the various buses of the processor 100 according to the invention. Although it is not possible to take them into account, the probability of failures in the device according to the present invention is very low. Thus, in the alternative embodiment shown in FIG. 4, all the data pertaining to the failure is made compact to the maximum extent so as to devote a minimum amount of equipment to the storage and transmission of error signals. For example, the status register 71 stores, on one bit, only data pertaining to the parity fault detected on various buses.

For example, the bus 47 comprises twenty-five bits plus one parity bit, the bus 51 comprises twenty-four bits plus four parity bit, the bus 501 has fifty-one bits plus one or three parity bits (depending on the instant of reception), the bus 52 comprises twelve bits plus four parity bits, each of the buses 50 comprises twelve bits plus four parity bits, each of the buses 41 comprises eighty-four bits plus four parity bits. Each of the said buses is connected to a validation package 80. The validation package registers a datum, for example of one bit, in the status register 71 if a parity error has been detected. The content of the status register 71 is capable of being read in parallel by the sequencer 502 of FIG. 1, by means of the bus 50. The sequencers 502 store, for example, in the memory 31, the content of the status registers 71 of the various processors 100. Thus, using the buses 45 and 44, the master processor 100 can consult the content of the status registers of all the processors 100 in the memory 31.

Advantageously, whenever one of the signals coming from the validation devices 80 is equal to 1 a bit is emitted to the bus 46 to warn the sequencer 502 that there is an operational problem in the computer according to the present invention.

FIG. 5 shows a flow chart of the program performed by the master processor 101 and/or the sequencer 502 enabling the reconfiguration of the computer according to the present invention.

At 60, it is determined whether an operating error has been detected.

If not, the program returns to 60 through the loop 61.

If yes, the program goes to 63.

At 63, the source and seriousness of the error are determined.

The program goes to 64.

At 64, the system is reconfigured by the elimination of the faulty device.

The program goes 65.

At 65, the reconfiguration of the device according to the present invention is complete.

FIG. 6 shows an alternative embodiment of the program of FIG. 5.

At 66, it is determined whether the system is at a critical stage.

If yes, the program goes to 65.

At 65, the reconfiguration is stopped.

If not, the program goes to 60.

At 60, it is determined whether an error has been detected.

If not, the program returns to 60 through the loop 61.

If yes, the program goes to 63.

At 63, the source and seriousness of the errors observed are determined.

The program goes to 64.

At 64, the system is reconfigured.

The program goes to 65.

At 65, the reconfiguration of the device according to the present invention is completed.

FIG. 7 shows an alternative embodiment of the program of FIG. 5.

At 60, it is determined whether an operating error has been detected.

If not, the program returns to 60.

If yes, the program goes to 66.

At 66, it is determined whether the computer according to the present invention is in a critical stage.

If yes, the program returns to 60.

If not, the program goes to 63.

At 63, the source and seriousness of the errors observed are determined.

If yes, the program goes to 64.

At 64, the system is reconfigured.

The program goes to 65.

At 65, the execution of the program is completed.

FIG. 8 shows an alternative embodiment of the program of FIG. 5.

At 60, it is determined whether an operating error has been detected.

If not, the program returns to 60.

If yes, the program goes to 63.

At 63, the source and seriousness of the errors observed are determined.

The program goes to 66

At 66, it is determined whether the computer according to the present invention is in a critical stage.

If yes, the program goes to 60.

If not, the program goes to 64.

At 64, the system is reconfigured.

The program goes to 65.

At 65, the execution of the program is completed.

In an alternative embodiment which is not shown, it is possible to have several thresholds of seriousness of the critical stage. These thresholds are detected, for example, firstly between the error detection 60 and the determination of the source and seriousness of the error at 63, and secondly between the determination of the source and seriousness of the error at 63 and the reconfiguring of the system at 64.

FIG. 9 shows the flow chart of a sub-program for determining the source and seriousness of the error corresponding to the block 63 of FIGS. 7 and 8.

At 631, the computations of the computer according to the present invention are stopped.

The program goes to 632.

At 632 the status registers, for example, of all the devices being tested, for example those of the processors 100 are read through the bus 50.

The program goes to 633.

At 633, the master processor 101 of FIG. 1 reads the values contained in the memory 31.

The program goes to 634.

At 634, the master processor 101 determines the source and seriousness of the failures occuring in the computers according to the present invention.

FIG. 10 shows an alternative embodiment of reconfigurations of the computer according to the present invention. This corresponds to the block 64 of FIG. 5.

At 641, the computations are stopped.

The program goes to 642.

At 642, the processors 100 are activated.

The program goes to 643.

At 643, the data are written at the interfaces of the processors 100 enabling the processors to be started up again.

The program goes to 644.

At 644, the data are written in the status registers of the processors 100.

FIG. 11 shows an alternative embodiment of the procedure for reconfiguring the computer according to the present invention. This corresponds top the block 64 of FIG. 5.

At 645, the master processor reads the number of processors 100 available in the computer.

The program goes 646.

At 646, the processors 100 of the computer are renumbered.

Advantageously, all the working processors are numbered in the order of their physical position in the computer. This makes it possible to simplify the operating algorithms of the computer. However, in order not to lose the computations present in the various registers and memories of the computer, it is possible to keep the preceding processors 100 (according to number) working. The redundant processors 100 replace the failed processor or processors, taking their number or numbers.

The program goes to 647.

At 647 it is determined whether the number of processors in valid working order (N) is smaller than the number of processors capable of being used (H).

If not the programme goes to 649

If yes, the program goes to 648.

At 648, the algorithm enabling the computer to work in lower mode, with a reduced bumber of available processors 100, is changed. In this case, it is possible that the master processor 100 is obliged to reload from the memory 31 through the buses 44 and 45, and from the memory 30 through the buses 48 and 53.

The program goes to 649.

At 649, the processors 100 are reinitialized.

The program goes to 650.

At 650, the computer is started up again.

The program goes to 651.

At 651 the reconfiguring of the device according to the present invention is completed.

FIG. 12 shows an embodiment of the sub-program to determine the source and seriousness of the error, corresponding to the block 63 of the FIG. 5, adapted to a computer structure in which reading of the status word is done through the ring-connected bus 50.

At 641, the computations are stopped.

At 647, a bit indicating the malfunctioning of the system is emitted to the bus 46.

The program goes to 648. At 648, the values of the status register 71 are shifted by one unit at the ring-connected bus 50.

The program goes to 649.

At 649, a value of the status register 71 is read at the bus 50.

The program goes to 650.

At 650, the counter is incremented by one unit.

At 650, the program goes to 651.

At 651, it is ascertained that the value of the status registers 71 of all the processors 100 has not yet been read.

If yes, the program goes to 648.

If not, the program goes to 652.

At 652, the master processor determines the elements of the computer which are malfunctioning, and determines the seriousness of the faults.

The present invention applies to the making of a vectorial computer of great processing capacity.

The invention applies, in particular, to the computation of two-dimensional and three-dimensional images, the processing of signals, especially radar and sonar signals and scientific computation as well as to the monitoring of industrial processes.

What is claimed is:

1. A single instruction multiple data stream computer comprising plural computing processors, redundant processor for, in the event of failure of any one of computing processors, replacing one of said computing processors, and a sequencer for giving instructions to be carried out, simultaneously to all said computing processors, wherein at the initialization of the computations, each processor is assigned a number, and wherein, in the event of the failure of a processor, the processors that are working are renumbered according to their physical position in the computer.

2. A computer according to the claim 1 capable of working in reduced mode, sharing out the computations to be performed to the processors in good working order, should the number of failed processors be greater than the number of redundant processors.

3. A computer according to the claim 1 wherein the processor capable of being replaced in the event of failure comprises register means for storing data pertaining to the malfunctioning of the device;

4. A computer according to the claim 3 wherein the data pertaining to the malfunctioning of the device is the inversion of a bit in the event of the detection of a parity error during transmission.

5. A computer according to the claim 3 wherein each error detected causes a datum to be sent to the sequencer on a bus.

6. A computer according to the claim 3 wherein the content of the register capable of storing data on the malfunction can be read by the processor and/or the sequencer by means of a series bus.

7. A computer according to the claim 1 wherein the processors 100 are capable of receiving a command to de-activate the processor.

8. A single instruction multiple data stream computer comprising plural computing processors, redundant processor for, in the event of failure of any one of computing processors, replacing one of said computing processors, and a sequencer for giving instructions to be carried out, simultaneously to all said computing processors, wherein at the initialization of the computations, each processor is assigned a number, and wherein, in the event of failure of a processor, a redundant processor is assigned the number of the failed processor.

9. A single instruction multiple data stream computer comprising plural computing processors, redundant processor for, in the event of failure of any one of computing processors, replacing one of said computing processors, and a sequencer for giving instructions to be carried out, simultaneously to all said computing processors, comprising a general-purpose processor comprising means for initializing the system when the computations are started up, assigning each processor a number during initialization, and renumbering the processors and starting up the computer again after a failure.

10. A computer according to the claim 9 wherein the general-purpose computer is a microprocessor.

11. A computer according to the claim 9 wherein the computer including means for determining when it is less harmful to reconfigure the system than to continue computations with a partially malfunctioning computer.

12. A computer according to the claim 11 wherein the computer can perform a partial reconfiguring of the computer, minimizing the effects of the failure of at least one device of the computer, and then completely reconfigure the computer at the instant when the complete reconfiguration is less harmful to performance of the tasks assigned to the said computer.

* * * * *